United States Patent [19]

Dapiran

[11] 4,196,620
[45] Apr. 8, 1980

[54] APPARATUS FOR THE DYNAMIC TESTING OF GEARS

[75] Inventor: Alirio Dapiran, Montalto Dora, Italy
[73] Assignee: Fial Societa per Azioni, Turin, Italy
[21] Appl. No.: 961,066
[22] Filed: Nov. 15, 1978
[30] Foreign Application Priority Data
Nov. 25, 1977 [IT] Italy .............................. 69662 A/77
[51] Int. Cl.² ......................................... G01M 13/02
[52] U.S. Cl. ............................................... 73/162
[58] Field of Search ......................................... 73/162

[56] References Cited
U.S. PATENT DOCUMENTS

| | | | |
|---|---|---|---|
| 3,405,557 | 10/1958 | Sinke | 73/162 |
| 3,580,068 | 5/1971 | Hoodwin | 73/162 |
| 3,715,909 | 2/1973 | Wolanin | 73/162 |

FOREIGN PATENT DOCUMENTS

1224411  3/1971  United Kingdom ...................... 73/162

*Primary Examiner*—S. Clement Swisher
*Attorney, Agent, or Firm*—Sughrue, Rothwell, Mion, Zinn and Macpeak

[57] ABSTRACT

Apparatus for the dynamic testing of a pair of meshing gear wheels by driving one and restraining the rotation of the other, in which the two gear wheels under test are held in mesh with one another and carried by separate rotary supports comprising pairs of aligned rotary spindles, having means for clamping a wheel under test between facing ends thereof, one spindle of each pair being axially displaceable to effect such clamping and the other spindle of each pair being connected to a rotary electrical machine which can function both as a motor and a brake; accelerometer transducers are mounted on the said one spindle of each pair to rotate therewith and thus with the wheels under test, the output signals from the transducers are fed via slip rings to processing circuits including means for summing and squaring them before passing the processed signals for display.

15 Claims, 12 Drawing Figures

APPARATUS FOR THE DYNAMIC TESTING OF GEARS

The present invention relates to apparatus for the dynamic testing of a pair of meshing gear wheels, one driving and one driven, of the type comprising first and second rotary support means one of which carries the driving wheel and the other of which carries the driven wheel, the two wheels meshing with one another, motor means for driving one of the wheels to rotate, braking means for restraining the rotation of the other wheel, accelerometer means being associated with the first and/or the second support means to detect the vibrations of the relevant wheel perpendicularly to its axis of rotation and for providing electrical signals representative thereof, means for processing the electrical signals produced by the accelerometer means, and means for the visual display and/or recording of the processed electrical signals.

When used herein the terms "gear wheel", 'toothed wheel' and 'wheel' will be understood to refer to any component having spur or bevel teeth constituting an independent component or forming part of an assembly. Thus, a toothed wheel may be among other things, a sprocket or pinion, a toothed ring or even teeth formed on a shaft or the like.

It is well known that any mechanism containing gears transmits to the surroundings a certain amount of noise due to vibrations which originate from the irregularity of the movement of the gears, which vibrations are transmitted by way of surfaces in contact with the gears of parts which vibrate forcedly under the action of this irregularity.

When two toothed wheels are in moving contact with one another two phenomena may be noted in connection with the gearing: the first of these is that between the two wheels 'tangential' forces are exerted perpendicular to the surfaces in contact. Although, theoretically, to a constant applied torque there should correspond a constant force (and relevant reaction), in practice, due to inevitable intrinsic defects of the two wheels in contact the forces change in magnitude, direction and line of action, giving rise to the vibrations mentioned above. The variations of magnitude of the forces are due to the inertia of the driven gear or gears, the change of direction is caused by a variation in shape of the flanks of the teeth from the theoretical involute shape, and the change in the line of action is due to the fact that this line always extends through a center of gravity with respect to the contact region between the meshing teeth. The second of the phenomena is that, even if the driving wheel rotates with uniform motion, the driven gear will have a velocity which varies about the theoretical velocity, as a result of the pitch errors in the teeth, of the eccentricity of the wheels with respect to their axes of rotation, and of the deviation in shape of the flanks of the teeth from the theoretical involute shape. This variation in the velocity of the driven toothed wheel is connected with the noise.

The two phenomena mentioned above, which result from geometric irregularity of the gears, may be evaluated by various means among which the most suitable, and the one which lends itself to industrial testing of mass production, consists in making accelerometric measurements by means of apparatus of the general type referred to in the preamble known as a 'gear sound tester' or as a 'dynamic gearmeter'.

In known apparatus of this type, the rotary support means are constituted by a pair of chucks to which are fixed respective toothed wheels being tested. The vibrations are measured by means of accelerometers connected to the supports or bearings in which the chucks are rotatably borne. The electrical signals produced by such accelerometers, after any processing to eliminate, as far as is possible, spurious components, are displayed in the form of a trace on an oscilloscope and/or as a line on a chart recorder. However, because of the way in which the accelerometer transducers are installed, their signals do not really reflect the positive and negative accelerations due to individual teeth defects. In fact, the direction of maximum sensitivity of the accelerometer is fixed in space and is thus sensitive solely to the component of the acceleration vector oriented in this direction at any one time, and this besides varying its absolute value, also varies in direction and line of action.

Thus with the known apparatus it is only possible to evaluate defects of the teeth very approximately, and such evaluation is made even more difficult by the many spurious components in the transducer signals, which components it is not possible to eliminate completely, and which are due to vibrations not dependent on defects of the teeth. Of these spurious components the most important is that which has a frequency corresponding to the characteristic or resonant frequency of the measuring bench, which is characterised by the sum of the vibrations of each component in motion.

Futhermore, to locate individual defective teeth by means of accelerometers which are stationary with respect to a fixed frame of reference is not possible unless there is also available a separate system for identifying the instantaneous angular position of the wheel in rotation, in order to obtain a trace indicating such angular position, to be combined with the trace indicating the accelerations.

The technical problem which the present invention seeks to solve is that of providing apparatus for the dynamic testing of gears, of the general type outlined above, with which it would be possible to obtain more precise indications of teeth defects than can be obtained by the conventional apparatus.

According to the present invention there is provided apparatus for the dynamic testing of a pair of meshing toothed wheels, one driving and one driven, of the type comprising first and second rotary support means for supporting respectively the two wheels to be tested in mesh with one another, motor means for driving the rotary support means of one of the said two wheels under test to rotate, braking means for restraining the rotation of the rotary support means of the other of the two wheels, accelerometer means connected to the first and/or to the second rotary support means, operable to detect the vibrations of at least one of the wheels and to produce electrical signals representative thereof, means for processing the electrical signals produced by the accelerometer means, and means for the visual display and/or recording of the processed electrical signals, in which the accelerometer means comprise a pair of accelerometer transducers mounted so as to rotate with one of the said two wheels under test on a part of the said rotary support means which is not stressed by the forces transmitted from the said motor means through the rotary support means and the wheels under test to the braking means, these transducers having their directions of maximum sensitivity perpendicular to one another and to the axis of rotation of the part of the rotary support means on which they are carried, and intersecting on this axis, being positioned with their masses lying substantially on this axis, and being electrically connected to the means for processing their output signals via respective slip rings, the said means for processing the transducer output signals comprising means for squaring the signals produced by each transducer and means for summing the squared signals.

In apparatus formed as an embodiment of the invention, the accelerometer transducers are effectively mounted for rotation with the wheel being tested, and, moreover, are positioned as near to it as possible. As a result of their being positioned in this way, the accelerometers are not substantially influenced by the inevitable spurious vibrations caused by the motor means and by the braking means, still less by the other components transmitting motion. Being assembled at 90° to each other, the transducers are each sensitive to one of two mutually perpendicular components of the acceleration to be detected and produce signals proportional to these components. The squaring and subsequent summation of the transducer signals make it possible to obtain a final signal in which the form of the accelerations or vibrations and in a plane perpendicular to the axis of rotation of the wheel which are present as a result of tooth defects, can be established without there being present in the signal any significant spurious component due to the rotation.

Finally, since the angular position of the accelerometer is fixed in relation to the wheel being tested, it will be appreciated how easy it is to locate the position of a defective tooth from the position of that part of the oscilloscope or chart recorder trace which corresponds to the defect, providing the trace is always made to start at a given angular position of the wheel, which is quite easy to do.

One embodiment of the invention will now be more particularly described, by way of example only, with reference to the accompanying drawings, in which.

Figure 1:
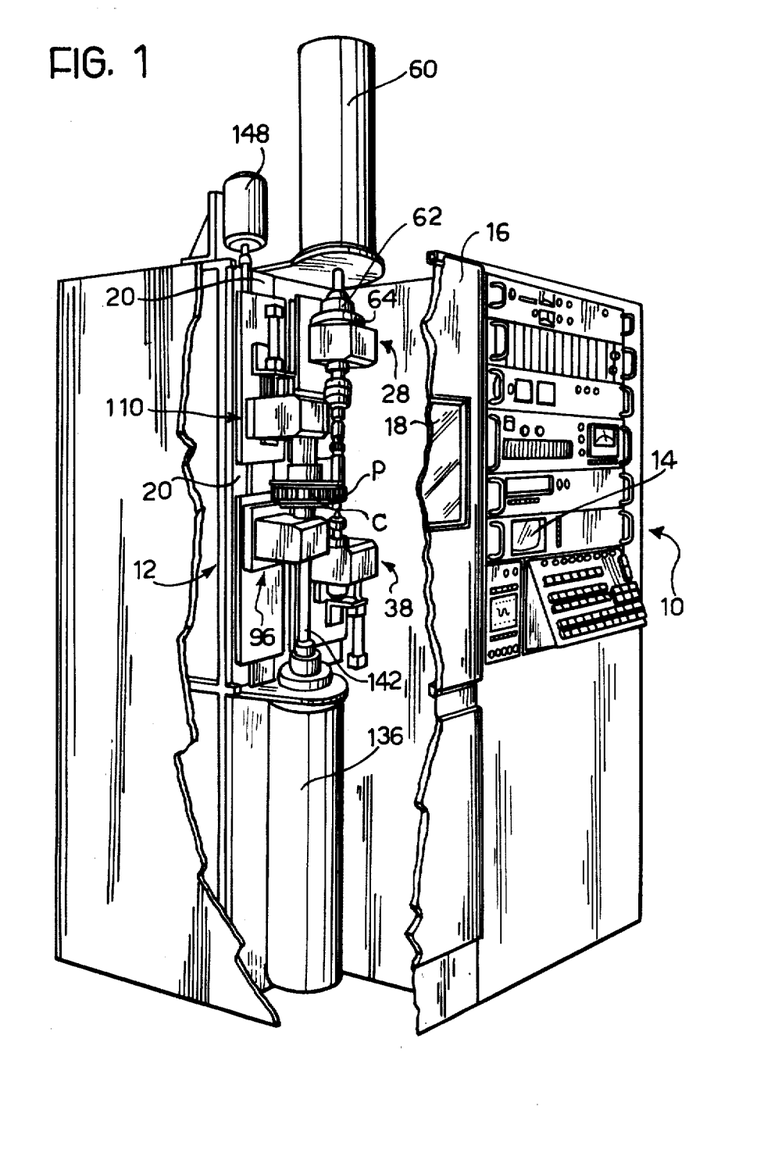
FIG. 1 is a view in cutaway perspective of the apparatus as a whole.
Figure 2:
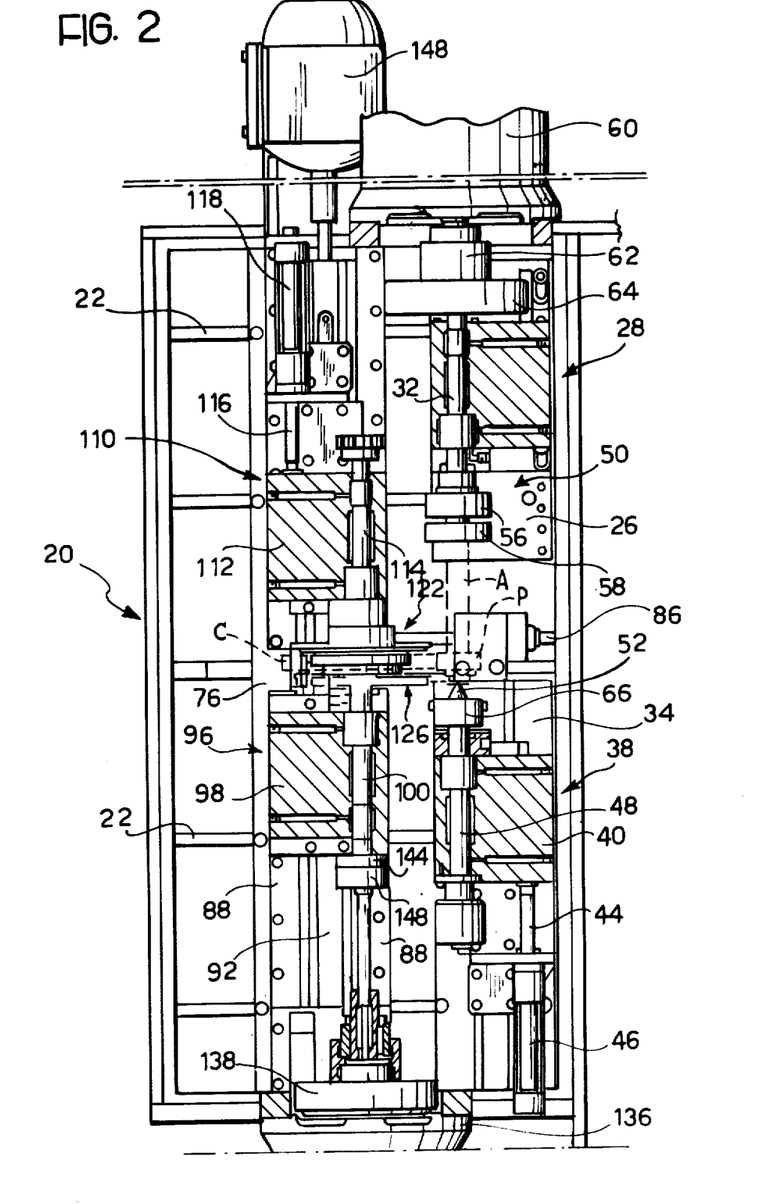
FIG. 2 is a front view of the mechanical part of the apparatus shown on the left of FIG. 1.

With reference to FIG. 1, the apparatus according to the invention is housed in a robust metal casing which may be considered as being separated into two basic parts: a control compartment 10 and a test compartment 12.

The control compartment 10 has on its front face a control panel comprising, among other things, an oscilloscope, the screen of which is indicated 14.

Access to the test compartment 12 is obtained through a door 16 which is provided with a transparent screen 18 by means of which it is possible to observe the interior of the test compartment in use of the apparatus.

Referring now to FIGS. 1, 2, 3 and 5, the test compartment 12 is delimited at the rear by a thick vertical cast-iron plate 20, which functions as a baseplate and constitutes an inertial block of considerable mass. The baseplate 20 is suspended from the load-bearing structure of the casing of the apparatus by means of resilient supports (not shown) the rigidity of which is calculated so as to give the whole assembly of the baseplate 20 and the parts supported thereby a characteristic or resonant frequency of vibration, which is very low, and in particular lower than the minimum frequency expected to be encountered in the measurement. For example, for tests in which the slower wheel being tested rotates with a minimum rotational speed of 200 revolutions per minute, that is about 3.3 Hz, the above system will have to have a characteristic frequency of about 2 Hz. In addition, the casing of the apparatus stands on the floor supported by resilient feet so as to reduce the vibrations which can be transmitted to it from the ground.

The baseplate 20 has a plurality of horizontal T-section grooves 22 in the front face thereof, which grooves are used, as will be described below, to secure various support plates with the possibility of horizontal adjustment. One such support plate, indicated 26, (FIG. 3) carries a first spindle support generally indicated 28, which comprises basically a hydrostatic bearing block 30 within which is rotatable a first spindle 32 borne on axial and radial hydrostatic bearings fed in use with fluid under pressure through channels in the bearing block 30, which channels are connected to a source of hydraulic fluid under pressure (not shown); the various channels and chambers of the hydrostatic bearings can be seen in FIG. 3 but are not separately referenced.

Figure 4:
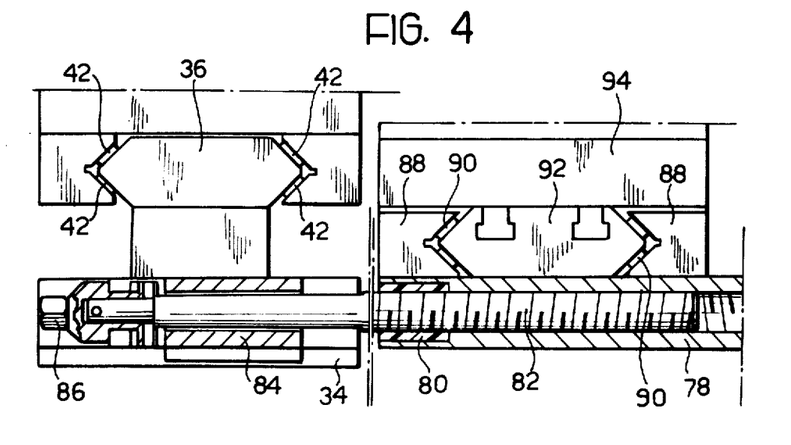
FIG. 4 is a horizontal section taken on the line IV—IV of FIG. 3, on a larger scale.

Below the support plate 26 there is fixed to the baseplate 20, in a manner which permits of horizontal adjustment, another support plate 34 (FIGS. 2 and 4) which supports a vertical guide 36 (FIG. 4). A second spindle support, generally indicated 38 and basically comprising a second bearing block 40, similar to the bearing block 30 of the first spindle support, is vertically slidably mounted on the guide 36 with the interposition of linear roller bearings 42 of the well known 'INA' type. Connected to the second bearing block 40 is the piston rod 44 of a first linear hydraulic actuator 46 of the cylinder and piston type, which is mounted with its axis vertical, and is movable to effect vertical linear movement of the second bearing block 40 up and down over at least a limited vertical range of movement.

The bearing block 40 is formed with passages constituting axial and radial hydrostatic bearings for a second spindle 48 mounted rotatably in the second bearing block 40 with its axis, vertical and accurately aligned with the first spindle 32. The channels which direct hydraulic fluid to the chambers of the hydrostatic bearings of the bearing block 40, from the same source of fluid under pressure as mentioned above, can be seen in FIG. 3, but are not separately referenced.

Figure 3:
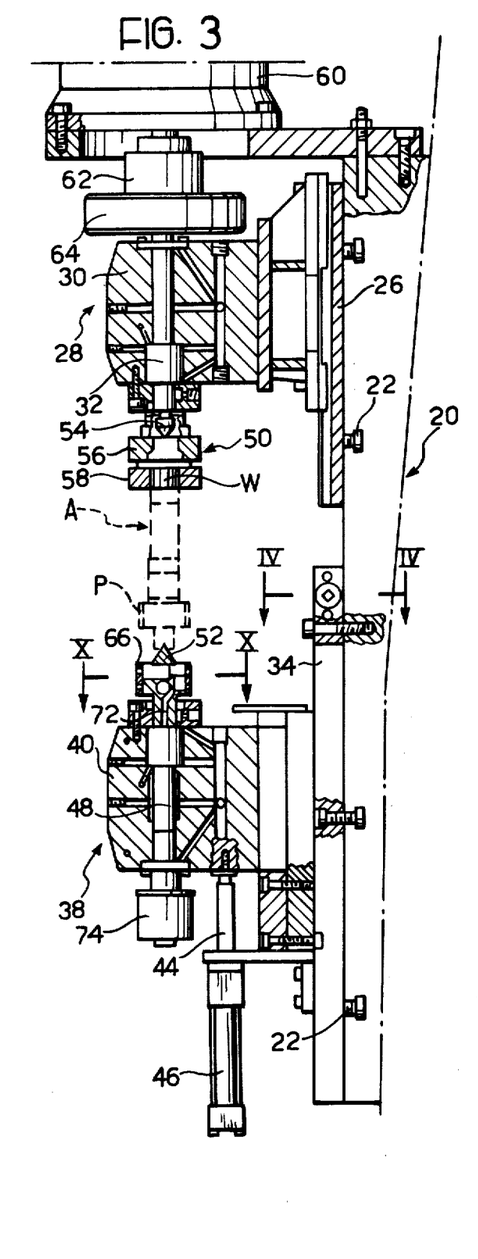
FIG. 3 is a partially sectioned side view of the support assembly carrying a driving wheel being tested.

The ends of the first spindle 32 and of the second spindle 48 carry respective holding members 50 and 52 for engaging a toothed wheel being tested and holding it between them. In the present case the wheel under test consists of a pinion P of a motor-vehicle differential gear, which is in the form of teeth formed on a shaft A. The first holding member 50 comprises a point 54 which in use engages one of the grinding 'centres' of the shaft A, that is a small conical recess in the end face of the shaft A accurately concentric with the axis of rotation of the shaft, by which the shaft is supported when being ground to shape. The second holding member 52 likewise consists simply of a point intended to engage the other grinding 'centre' of the shaft A. The first holding member 50 also includes a sleeve 56 fixed to the spindle 32 and to which is fixed a collar 58 which has internal teeth of a type suitable to cooperatively engage corresponding teeth on the shaft A, for the purposes of engaging the shaft A and the first spindle 32 for rotation together.

It will be appreciated that the holding of the shaft A between the first spindle 32 and the second spindle 48 is effected when the second bearing block 40 is moved up towards the first bearing block 30 by admitting fluid under pressure into the lower end of the linear actuator 46.

To the first spindle 32 there is connected a synchronous electric motor 60. This motor has a continuously variable speed, preferably between 200 rpm and 4000 rpm with a stability, in its speed of rotation, of 5%. The regulation of the rotational speed of the motor 60 is obtained by means of a thyristor supply system (not shown) housed in the control compartment 10. The motor 60 is capable of supplying a power corresponding to a constant torque, preferably between 0.1 and 0.7 Kgm. The shaft of the motor 60 is in fact connected to the first spindle 32 by means of a coupling 62 of the well known 'Bowlex' type, which comprises a toothed coupling with convex teeth set in a part of resinous material for the purpose of damping the vibrations. To improve the damping of any vibrations the spaces between the teeth of the coupling are filled with silicone grease.

The first spindle 32 is also connected to a flywheel 64 the function of which is to smooth the rotational motion, in particular eliminating the effects of the periodic interruption of the supply waveform to the motor 60 due to the operation of the thyristor speed control system.

Figure 10:
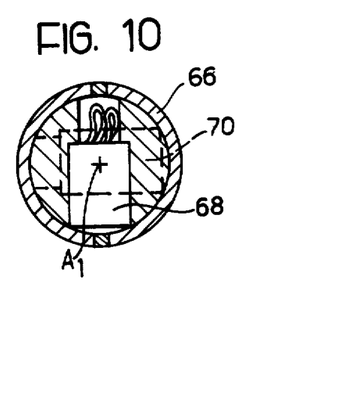
FIG. 10 is a horizontal sectional view taken on the line X—X of FIG. 3, on a larger scale.

The second holding member 52 is formed integrally with a bush 66 which, as shown in FIG. 10, houses a pair of accelerometer transducers 68, 70. These transducers are mounted with their directions of maximum sensitivity perpendicular to the axis of rotation of the second spindle 48, which is coaxial with the axis of rotation of the wheel P on the shaft A being tested. The two directions of maximum sensitivity are perpendicular to each other along lines which intersect on the axis of rotation. Furthermore, the masses of the two accelerometers 68 and 70 are located substantially on the axis of rotation, the position of which has been marked A, in FIG. 10. The two transducers 68, 70 are preferably of the "PCB Series 300" piezo-electric quartz type, each incorporating a respective transistorised amplifier for their electrical signals.

Through the second spindle 48 extends an internal passage 72 along which pass electrical conductors carrying signals from the amplifiers and supplying electrical power to the amplifiers. These conductors lead to a slip ring (not shown) housed in a bush 74 which is located at the lower end of the second spindle 48. This slip ring may in a practical embodiment be of the "Lebow mod. 6105-4-S/N 329" type. The use of amplifiers incorporated in the transducers 68 and 70 is advantageous in that it makes it possible to obtain at the slip ring, signals of such an amplitude that interference due to the slip ring is negligible. The function of the transducers 68 and 70 will be discussed in greater detail below.

To the baseplate 20 is fixed, spaced to one side of the support plates 26 and 34, another support plate 76 (FIGS. 2 and 5), which extends over the full height of the baseplate 20. The support plate 76 is carried on the baseplate 20 in such a way that is can be adjusted horizontally with respect to the support plates 26 and 34. By means of a system of horizontal keys (not shown) there is carried on the support plate 76, for horizontal sliding movement, a second support plate 78 which likewise extends over the full height of the baseplate 20. Fixed to the plate 78 is a nut 80 (FIG. 4) in which is engaged a translation screw 82. The latter is carried rotatably but not slidably in a sleeve 84 fixed to the baseplate 20 and has a square end 86 for engagement by a suitable key. This system makes it possible to adjust micrometrically the lateral position of the plate 78 thereby adjusting the distances between the centres of the two wheels under test and thus their degree of meshing. As will be seen, the second of the wheels under test is supported from the plate 78.

The plate 78 has a pair of vertical V guides 88 (FIGS. 2, 4 and 6) between which is assembled slidably with the interposition of "INA" linear roller bearings 90, a vertical guide 92, exactly like the guide 36 of the support plate 34. The vertical guide 92 extends substantially over the full height of the baseplate 20. On the lower part of the guide 92 is carried a support plate 94, on which is mounted a third spindle support, generally indicated 96, which basically comprises a bearing block 98 like the bearing blocks 30 and 40. The third bearing block 98 carries a third spindle 100 for rotation therein, borne by means of radial and axial hydrostatic bearings. The channels for the supply of hydraulic fluid to the chambers of the hydrostatic bearings can be seen in FIG. 5, but are not separately referenced; they are also connected to the same source of fluid under pressure as the hydrostatic bearings of the first and second spindles 28 and 48 by means not shown in the drawings.

To the upper part of the guide 92 is fixed a second parallel guide 102 (FIG. 6) coupled, by means of "INA" linear roller bearings 104, to a further pair of parallel guides 106, fixed to a further support plate 108. The latter (FIGS. 2 and 5) supports a fourth spindle support, generally indicated 110, which basically comprises a fourth bearing block 112 like the third bearing block 98. In the fourth bearing block 112 there is rotatably carried a fourth spindle 114, borne therein by means of radial and axial hydrostatic bearings. Channels for the supply of hydraulic fluid under pressure to the chambers of these hydrostatic bearings can be seen in FIG. 5 but are not separately referenced, they are connected to the same source of fluid under pressure as the channels for the other hydrostatic bearings mentioned above. The fourth spindle 114 is exactly aligned with the third spindle 100.

Figure 8:
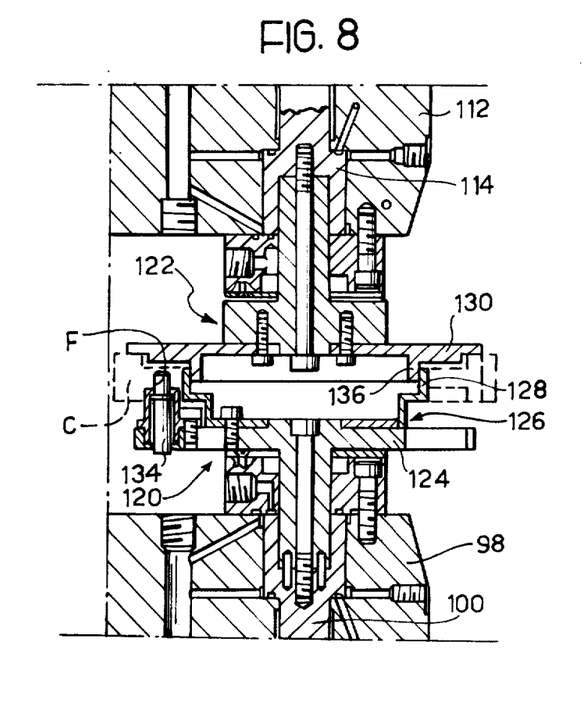
FIG. 8 is a vertical sectional view showing on a larger scale a further component of the assembly of FIG. 5.
Figure 9:
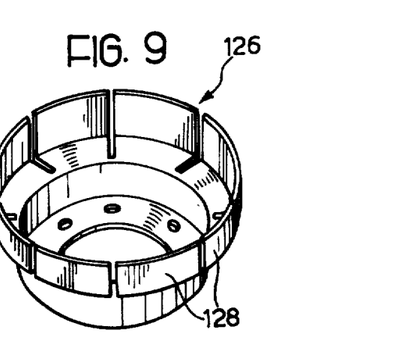
FIG. 9 is a perspective view of one of the components shown in FIG. 8.

To the fourth bearing block 112 there is connected the piston rod 116 of a second linear hydraulic actuator 118 of the cylinder and piston type, the function of which is to effect vertical up and down movement of the fourth spindle support 110. The facing ends of the third spindle 100 and the fourth spindle 114 have respective holding members 120, 122 for engaging and clamping between them a whole under test which, in the case illustrated, is a differential ring gear C. As illustrated in FIG. 8, the holding member 120 of the third spindle 100 comprises a flange 124 to which is fixed a centering cup 126, which is more clearly shown in FIG. 9. The centering cup 126 comprises a circular array of thin axially extending plates 128 of accurately calibrated thickness, which in use engages the radially inner surface of the ring gear C. The holding member 122 of the fourth spindle 114 comprises a flange 130 on which is an annular narrow axially projecting ridge 132 which in use is engaged into the ring of thin plates 128 thereby clamping them between the said annular ridge and the ring gear C thus centering this latter with precision.

The flange 124 of the holding member 120 has on its circumference a circular series of resilient pegs 134, one of which can be seen in FIG. 8. The angular separation of these pegs is different from the angular separation of corresponding holes such as F in the rim C, in order to allow keying of the rim C onto the flange 124 in different angular positions by engaging one of the pegs 134 in a different one of the holes F. As will be appreciated, the clamping of the wheel C under test with respect to the third and fourth spindles 100, 114, is obtained by moving the fourth spindle support 110 down towards the third spindle support 96 by the introduction of fluid under pressure into the linear actuator 118.

Figure 5:
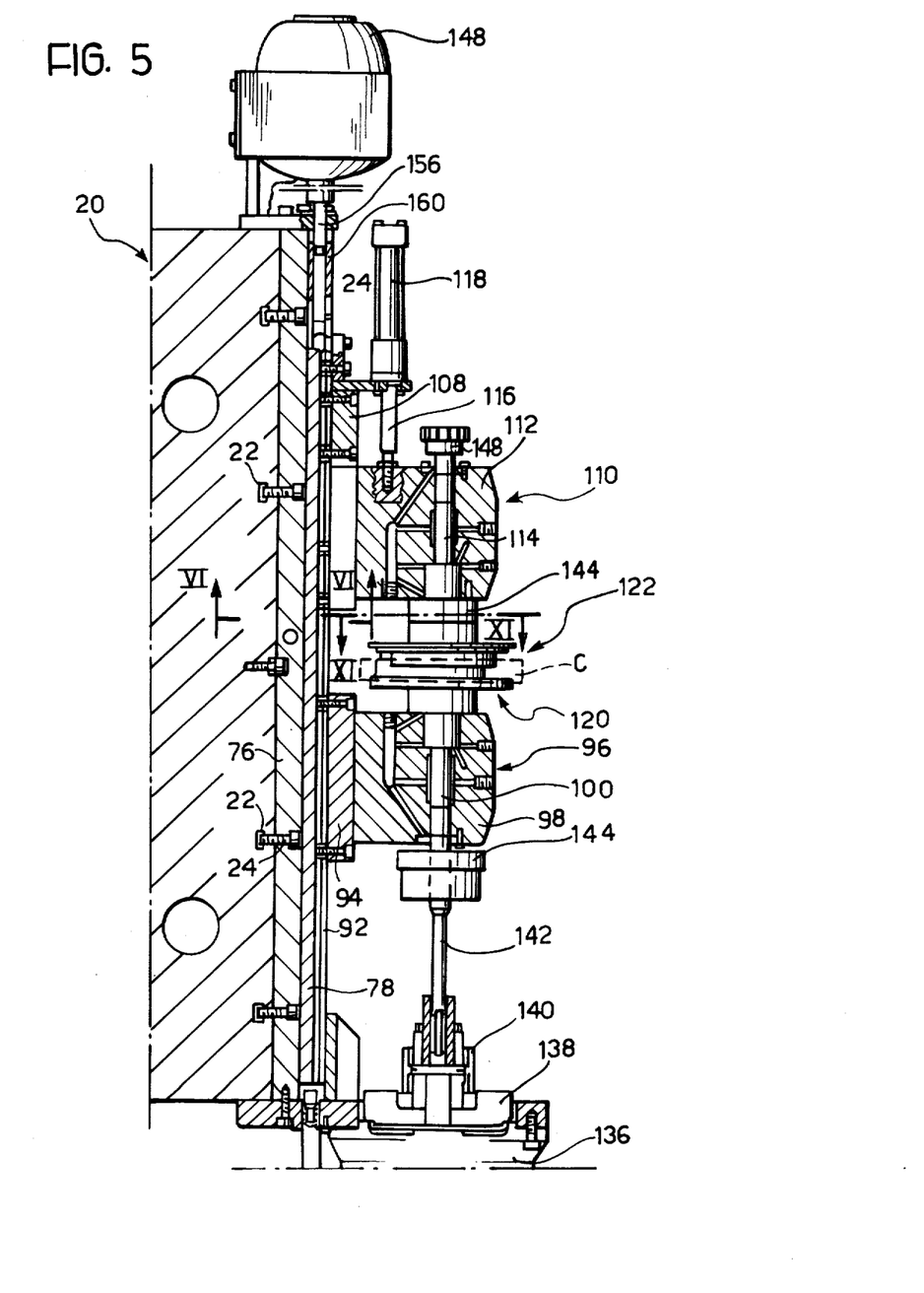
FIG. 5 is a partially sectioned side view of the support assembly carrying a driven wheel being tested.

To the third spindle 100 there is connected an electric motor 136, which is identical to the motor 60 connected to the first spindle 32 and supplied in the same way; the two motors can both be operated either to drive the associated spindle to rotate or to function as a brake. The supply circuits of the motors 60 and 136 are such that, during braking, a part of the braking power is returned to the supply line, thus limiting the formation of heat.

The motor/brake functions of the two motors 60 and 136 may be reversed without changing their direction of rotation for the purpose of testing opposite flanks of the teeth of the wheels P and C being tested thus simulating drive and overrun conditions characteristic of the use of the gears of motor vehicles. The fact that these tests can be carried out without it being necessary to change the direction of rotation of the motors is advantageous in a mass-production testing in that it eliminates lost time spent decelerating and accelerating the testing apparatus.

Onto the shaft of the motor 136 there is keyed a flywheel 138 similar to the flywheel 64 on the motor 60 and having the same function. The shaft of the motor 136 is also connected to a coupling 140 identical to the coupling 62. The connection between the coupling 140 and the third spindle 100 is completed by means of a replaceable drive transmission component having a torsional elasticity of predetermined value. This component, as shown, preferably consists of a shaft 142 which has a carefully gauged part of reduced cross section. The function of the shaft 142 or other equivalent drive transmission component is that of permitting the angular velocity of the two wheels under test as well as that of the spindles on which they are carried, to vary due to the irregularities or defects of the gear teeth being assessed, without thereby affecting appreciably the speed of rotation of the shaft of the motor/brake 136. The torsional elasticity of the shaft 142 or similar transmission component will in practice be selected experimentally each time in dependence on the characteristics of the wheels being tested.

Figure 11:
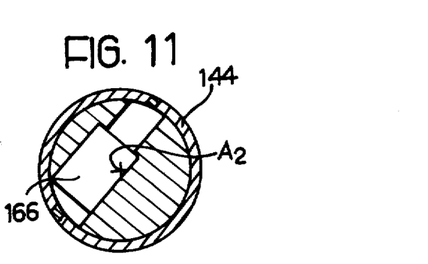
FIG. 11 is a similar horizontal sectional view, taken on the line XI—XI of FIG. 5, on a larger scale.

The third spindle 100 has a bush 144 in which, as illustrated in FIG. 11, there is housed an accelerometer transducer 146 of the same type as the accelerometer transducers 68 and 70, and this too incorporates an amplifier. This accelerometer transducer 146, however, is arranged tangentially that is circumferentially with respect to a circle concentric with respect to the axis $A_2$, of the spindle 100, the position of which axis is shown in FIG. 11. This transducer 146 thus detects positive and negative angular accelerations of the spindle 100, and thus of the gear wheels under test, resulting from the irregularities of the teeth. The third spindle 100 has an axial passage (not shown) through which pass electrical conductors supplying the accelerometer transducer 146 and its associated amplifier, and which are connected to a slip ring housed in a bush 148 connected to the end of the said third spindle 100.

The guide 92 allows vertical micrometric adjustments of the whole assembly comprising the third spindle support 96 and the fourth spindle support 110, for the purposes of making possible axial displacement of one of the wheels under test with respect to the other for a certain distance, of the order of a few millimeters (7 mm. in a particular case). This serves to allow testing of the two wheels over the full extent of their teeth, that is in axially displaced positions and not solely in positions of exact registration.

Figures 6, 7:
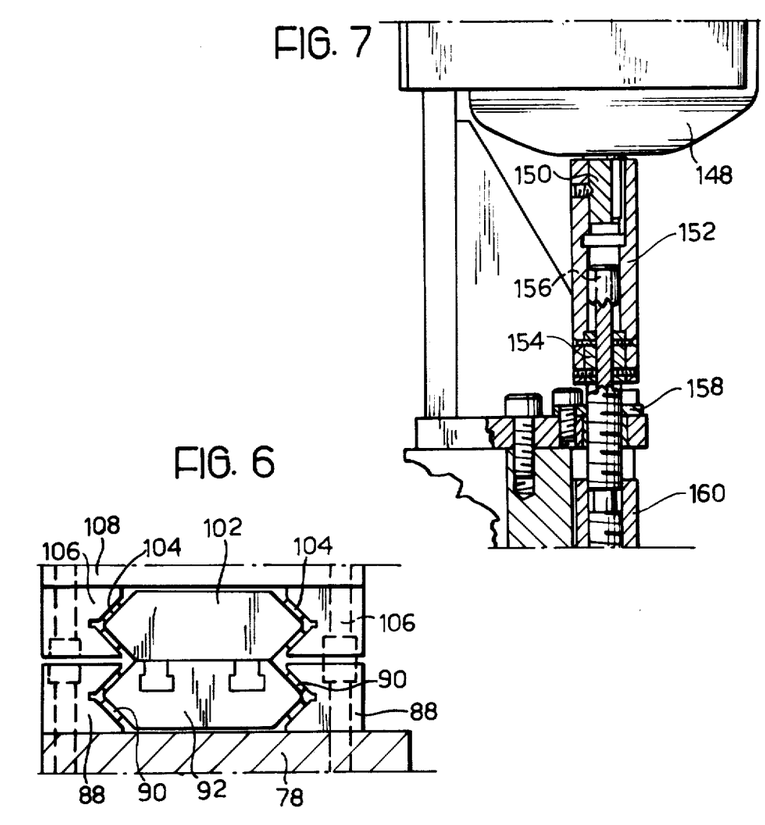
FIG. 6 is a horizontal section taken on the line VI—VI of FIG. 5, on a larger scale.
FIG. 7 is a partially sectioned, side view showing, on a larger scale, one component of the assembly shown in FIG. 5.

In order to effect vertical displacement of this assembly there is connected to the guide 92 a reversible electric motor 148 having a shaft 150 to which there is fixed a sleeve 152 which is coupled by means of pins 154 in a slidable but not a rotatable manner with a double-pitch screw 156. This latter has a first threaded portion engaged with an internally screw threaded fixed sleeve or nut 158 and a second threaded portion with slightly different pitch from the first, engaged with an internally screw threaded sleeve or nut 160. The nut 160 is connected to the guide 92. As it will be appreciated, the system just described is a double screw system with differential pitch by means of which it is possible to transform the rotation of the shaft 150 of the motor 148 into a micrometric translation of the guide 92 and thereby of the whole assembly carried by the third and fourth spindle support 96 and 110.

Figure 12:
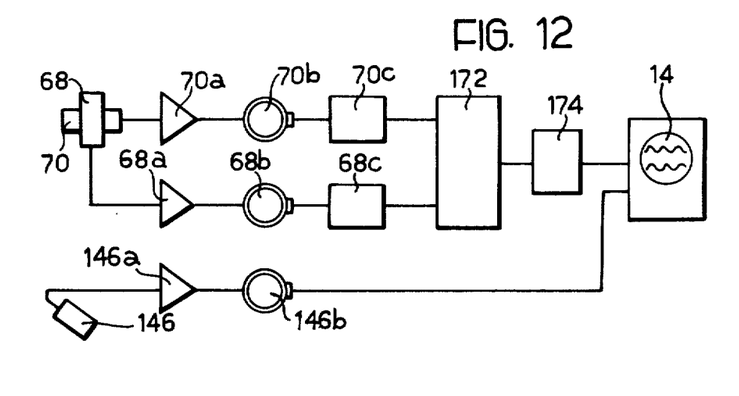
FIG. 12 is a simplified diagram showing the principal electrical and electronic components of the apparatus and their connections.

Referring now to FIG. 12, the two perpendicular accelerometer transducers 68 and 70 carried in the bush 74 of the second spindle 48, are connected, by their amplifiers 68a and 70a, to the aforementioned slip rings, schematically represented 68b and 70b in FIG. 12. By means of these slip rings, the accelerometer transducers 68 and 70 are connected to respective signal squaring devices 68c and 70c. The squared signals are then added together in summation means 172, which feeds the summed signal to vibrational analysis means 174. This latter preferably comprises a Fourier analyser such as that marketed by Hewett-Packard. The analysis means 174 makes it possible to separate various components of the summed, squared signal output from the summer 172 and to introduce them separately, for display, into the oscilloscope 14.

In addition, the oscilloscope 14 can receive signals from the tangential or circumferential accelerometer transducer 146, by means of the associated incorporated amplifier 146a and the revelant slip ring, schematically indicated by 146b.

In addition to, or instead of the oscilloscope 14, the use of a chart recorder is envisaged. It will be appreciated, moreover, that the said fourth spindle 114 could be supplied with a pair of perpendicular accelerometer transducers similar to the accelerometer transducers 68 and 70; likewise the second spindle 48 could be supplied with a tangential accelerometer transducer like that illustrated in the present embodiment on the fourth spindle.

All of the accelerometer transducers are positioned in close proximity to the relevant wheels being tested, and in a part of the rotary support means for these wheels which are not part of the power transmission system by which the drive passes from the motor/brake 60 to the brake/motor 136 or vice versa. By this arrangement, the signals from the accelerometer transducers correspond only to the defects of the wheels without this necessitating the weakening of the parts constituting the drive transmission and thus without generating spurious vibrations.

The two perpendicular accelerometer transducers 68 and 70 serve to detect, by sensing the positive and negative radial accelerations of the wheel to the vibration of which they are sensitive, the variations to which the forces exerted between the meshing wheels are subjected as a result of defects in the gear teeth. Each of these accelerometers effectively 'sees' that component which is parallel to the axis of the transducer of the force vector transmitted along the line of pressure between the teeth, as a rotating vector.

Due to the fact that the signals from the accelerometer transducers are first squared and then added together, the analysis means 172 receive a signal which is, independent of the frequency due to the rotational speed of the wheel being tested.

The "tangential" accelerometer transducer 146 makes it possible to obtain on the oscilloscope 14 (or on the chart recorder if such is used) another indication used for the evaluation of the quality of the gears, that is the positive and negative angular accelerations which are dependent on the toothing defects and which are also a source of noise.

The apparatus of the invention also has other advantages, principally due to the vertical arrangement of the axes of the wheels being tested. This vertical arrangement greatly facilitates the mounting and dismounting of the wheels being tested which is particularly useful when testing large numbers of basically similar gears. A second advantage of the vertical arrangement is that the apparatus occupies little floor space, extending in height rather than in width.

From the functional point of view the vertical axis arrangement offers the further advantage that the accelerometer transducers are not influenced by the force of gravity, which would introduce into their signals a component proportional to $+g$, and having the characteristic frequency of the rotational speed.

In this connection it is to be noted that it would be possible to adapt the apparatus of the invention for the testing of bevel gears. In this case, it being impossible to arrange both the axes vertically, it would be necessary to arrange vertically the axis of one of the wheels (preferably the driving wheel) and to mount the accelerometer transducers on a spindle having a vertical axis.

Other factors contributing to the elimination of spurious components of the signal are the hydrostatic support of the spindles, the fact that these are accurately coaxial with one another and with the motor/brake devices, thereby eliminating the need for separate members for the transmission of motion therebetween, the positions of the flywheels 64 and 138, and the considerable inertial mass of the baseplate 20. All this makes it possible to reduce the level of noise in the transducer signals which is lower than the threshold of interference of the instruments for measuring the vibrations.

As far as the hydrostatic bearings are concerned, it is advantageous for the source of hydraulic fluid under pressure, which supplies the chambers of the hydrostatic bearings, to be sound proofed, and for the pulses of the fluid to reach the chambers in coincidence of phase, since in this way their effect on the spindles is compensated.

What is claimed is:

1. In apparatus for the dynamic testing of a pair of meshing toothed wheels, one driving and one driven, of the type comprising:
   first and second rotary support means for supporting respectively the two wheels to be tested in mesh with one another,
   motor means for driving the rotary support means of one of said two wheels under test to rotate,
   braking means for restraining the rotation of the rotary support means of the other of the two wheels,
   accelerometer means connected to at least one of said first and said second rotary support means and operating to detect the vibrations of at least one of said wheels under test whereby to produce electrical signals representative thereof,
   means for processing said electrical signals produced by said accelerometer means, and
   display means for at least one of said visual display and recording of said processed electrical signals,
   the improvement wherein said accelerometer means comprise a pair of accelerometer transducers mounted on one of said rotary support means to rotate with one of said two wheels under test, on a part of said rotary support means which does not transmit the force from said motor means through said rotary support means and said wheels under test to said braking means, said transducers being positioned substantially on the axis of rotation of said one rotary support means and oriented with their directions of maximum sensitivity perpendicular to one another and to this axis and intersecting on this axis,
   slip ring means electrically connecting said accelerometer transducers to said means for processing the output signals, and
   said means for processing said transducer output signals including:
   means for squaring the signals produced by each said transducer, and
   means for summing said squared signals.

2. Apparatus as in claim 1, wherein there are interposed means for analysing said summed signals between said summing means and said one of visual display means and recording means.

3. Apparatus as in claim 1, wherein there is a further accelerometer transducer mounted on one of said first and second rotary support means, said further accelerometer transducer being positioned with its direction of maximum sensitivity oriented circumferentially with respect to a circle lying in a plane normal to the axis of rotation of said one rotary support means, means electrically connecting said further accelerometer transducer to said one of display and recording means, said electrical connecting means including a slip ring.

4. Apparatus as in claim 1, wherein each said accelerometer transducer has an associated electronic amplifier mounted on said rotary support means and electrically connected via the associated slip ring.

5. Apparatus as in claim 1, wherein said first rotary support means includes:

first and second rotary spindles, first and second spindle supports carrying respectively said first rotary spindle and said second rotary spindle, aligned with each other along a first axis, a holding member on each said spindle at the end thereof facing the other spindle, said holding members cooperating to hold a wheel under test to be carried by the said rotary support, said first spindle being axially fixed with respect to said first spindle support and being connected to said motor means to be driven thereby, and said second spindle being axially movable with respect to said first spindle support, first axial displacement means operating to displace said second spindle axially between a first position close to said first spindle to cooperate therewith to hold a wheel under test in position, and a second position spaced from said first spindle to permit mounting or removal of a wheel under test; and wherein said second rotary support means includes:

third and fourth rotary spindles, third and fourth spindle supports carrying respectively said third rotary spindle and said fourth rotary spindle aligned with each other along a second axis parallel to said first axis, a holding member on each said spindle at the end thereof facing the other spindle, said holding members cooperating to hold the other of said two wheels under test to be carried by said second rotary support means, said third spindle being axially fixed with respect to said third spindle support and being connected to said braking means for restraining its rotation, and said fourth spindle being axially movable with respect to said third spindle support, second axial displacement means operating to displace said fourth spindle axially between a first position close to the said third spindle to cooperate therewith to hold wheel under test on said second rotary support means, and a second position spaced from said third spindle to permit mounting and removal of a wheel under test, and means mounting said two accelerometer transducers on one of said second spindle and said fourth in close proximity to said holding member thereof.

6. Apparatus as in claim 5, wherein there is further provided a slide carrying at least one of said pairs of spindle supports, said slide being movable perpendicular to the common axis of the spindles carried by said spindle supports, means for effecting transverse linear displacement of said slide for effecting micrometric adjustment of the distance between the axis of said two pairs of spindles whereby to adjust the degree of meshing of said two wheels under test.

7. Apparatus as in claim 5, wherein said first and second axial displacement means comprise respective linear hydraulic actuators.

8. Apparatus as in claim 5, wherein both said motor means and said braking means comprise rotary electrical machines respectively connected to said first and said third spindles, the shafts of said rotary machines being aligned with the respective spindles and connected to the opposite ends thereof from that on which said holding member is carried.

9. Apparatus as in claim 5, wherein said third spindle is connected to said braking means by means of an interchangeable transmission component which has a torsional elasticity of predetermined value.

10. Apparatus as in claim 9, wherein said interchangeable transmission component comprises a shaft having a portion of calibrated reduced cross section.

11. Apparatus as in any of claims 5 to 10, wherein at least one of said rotary support means is carried on a slide which is movable parallel to the common axis of the spindles of said rotary support means, and means for effecting axial displacement of said slide whereby to effect micrometric adjustment of the relative axial position of said one rotary support means with respect to the other and thus of said two wheels under test.

12. Apparatus as in claim 11, wherein said means for effecting axial displacement of said slide comprise a reversible electric motor, a screw system connecting the shaft of said reversible electric motor to said slide, said screw system having two axially separated screw threaded portions of different pitch from one another.

13. Apparatus as in any one of claims 8 to 10, wherein said rotary electrical machines constituting said motor means and said braking means are both continuously variable in speed, and controllable by means of control devices such that one of said machines functions as a motor and the other as a brake or said other as a motor and said one as a brake, without reversing their direction of rotation.

14. Apparatus as in claim 13, wherein the axis of at least one of the two pairs of spindles is vertical.

15. Apparatus as in any of claims 5 to 13, wherein said parallel axis of said two pairs of spindles are vertical.

* * * * *